United States Patent [19]

Jenkins et al.

[11] Patent Number: 5,719,743

[45] Date of Patent: Feb. 17, 1998

[54] TORSO WORN COMPUTER WHICH CAN STAND ALONE

[75] Inventors: Michael D. Jenkins, Manassas; John W. Williams, Clifton, both of Va.; Peter A. Ronzani, Los Gatos, Calif.; Peter S. Hong, Centreville, Va.

[73] Assignee: Xybernaut Corporation, Fairfax, Va.

[21] Appl. No.: 698,319

[22] Filed: Aug. 15, 1996

[51] Int. Cl.$^6$ .................................. G06F 1/16; H05K 5/02
[52] U.S. Cl. ........................................... 361/683; 361/730
[58] Field of Search .............................. 361/680, 681, 361/683, 685, 686, 684, 730; 364/708.1, 709.02, 709.1, 710.01; 345/168, 169; 312/208.4; G06F 1/16

[56] References Cited

U.S. PATENT DOCUMENTS

| | | | |
|---|---|---|---|
| 5,285,398 | 2/1994 | Janik | 364/708.1 |
| 5,305,181 | 4/1994 | Schultz | 361/680 |
| 5,305,244 | 4/1994 | Newman et al. | 364/708.1 |
| 5,329,106 | 7/1994 | Home et al. | 235/472 |
| 5,416,730 | 5/1995 | Lookofsky | 364/708.1 |
| 5,432,510 | 7/1995 | Matthews | 341/20 |
| 5,491,651 | 2/1996 | Janik | 364/708.1 |
| 5,559,675 | 9/1996 | Hsieh et al. | 361/687 |
| B1 5,305,244 | 7/1996 | Newman et al. | 364/708.1 |

*Primary Examiner*—Lynn D. Feild
*Attorney, Agent, or Firm*—James J. Ralabate

[57] ABSTRACT

This computer structure provides a body-worn computer that is easily converted into a conventional or laptop computer. Also, the housing for this computer is symetrical so that when turned upside down the cables and cable connections always face the back of the user. A stand is provided in the housing for use when converting to a conventional computer. This stand doubles as a belt loop when the computer is used as a mobile body-worn computer.

8 Claims, 8 Drawing Sheets

TORSO WORN COMPUTER WHICH CAN STAND ALONE

This invention relates to a computer and, more specifically, to a user-supported mobile computer.

BACKGROUND OF THE INVENTION

There are known computers that have been used and disclosed involving wearable computers and computer components. The feature of these prior art computers is that they permit the user to have freedom to use his or her hands for repairing or other functions while using a fully functional computer. One of the most commercially successful and well known of these computers is the Mobile Assistance® available from Xybernaut Corporation of Fairfax, Va. Mobile Assistant® is a registered trademark of Xybernaut Corporation (formerly Computer Products & Services, Inc.)

U.S. Pat. No. 5,305,244 (Newman, et al.) describes the details of the Mobile Assistance® and fully discloses the components and function of such user-supported computers. Also, co-pending patent application Ser. No. 08/538,194 describes and claims further improvements and modifications to the Mobile Assistant®. Both U.S. Pat. No. 5,305,244 and Ser. No. 08/538,194 are owned by the assignee of the present application.

Also disclosing wearable computers are U.S. Pat. Nos. 5,285,398 (Janik I) and 5,491,651 (Janik II). Both of these patents disclose a belt computer containing the elements or components of a computer. In Janik I the plurality of computing elements are located on the belt and a flexible signal relaying means connects all of the elements for computing. A protective covering is used for enclosing said computer elements. In Janik II a similar belt computer is described and claimed in which the signal relaying means, the length of which between any two computing elements is greater than the length of the wearable number between any two computing elements. In both Janik I and Janik II the flexible wearable computer is in the form of a belt comprising around its periphery sequentially positioned computer elements.

In both Newman, et al. and Janik I and II, a body-worn computer is disclosed that has utility only as a body-worn mobile computer.

SUMMARY OF THE INVENTION

It is therefore an object of this invention to provide a computer structure devoid of the above noted disadvantages.

Another object of this invention is to provide a computer structure that can be used as both a mobile computer and a stand alone or desktop computer.

A further object of this invention is to provide a computer structure that when worn can be used interchangeably on the right or left side of a user.

A still further object of this invention is to provide a mobile computer structure that can be worn on any portion of the body in a hands-free manner.

Another still further object of this invention is to provide a mobile computer having outlets or other means to connect on to or to be comparable with components of a stand alone, laptop or desktop computer.

Yet another object of this invention is to provide a computer structure that contains substantially all of the components needed in a general purpose or conventional computer including but not limited to input/output means, processor means and storage means.

Yet still another object of this invention is to provide a mobile body-worn computer that can be worn and operated by both right- and left-handed users.

Other objects will become apparent upon a further reading of this disclosure.

The above objects and others are accomplished, generally speaking, by a computer structure that is usable as both a mobile body-worn computer and as a component for a stand alone, laptop or desktop computer, or any other conventional computer. By "conventional computer" is meant any computer known and used today such as those available from IBM, Dell, Apple, Compaq, Toshiba, Micron, Hewlett-Packard etc. The computer structure of this invention in one embodiment has a computer housing that can be worn around the waist of a user and is curved on its inner side (the side that contacts the user's waist) to be contoured in accordance with the curvature of the user's waist. It has structural dimensions or area that occupies only a portion of said user's waistline. Thus, unlike Janik I and II above discussed, does not encircle the entire waist of the user. When used as a waist-worn computer, it is important that cables and other electrical connections extend from the back portion of the computer so as to be out of the way and not interfere with the user's hands when he or she is attempting to repair an object or machine or otherwise use their hands. The computer structure is symetrical; therefore the computer can be turned upside down as a unit for left-hand operation; the cable outlets in this manner always will face the back of the user. Conversely, the mouse controls (when converted to a conventional computer) will always be positioned in the front of the computer housing convenient for the right-or left-handed user. The housing of the computer of this invention has outlets for connection to other components such as power supplies, monitors, keyboards or any other required component. All embodiments of a mobile computer described in co-pending application Ser. No. 08/538,194 and U.S. Pat. No. 5,305,244 are included in those structures usable in the present invention with the modification described and claimed herein. The disclosure of Ser. No. 08/538,194 is incorporated by reference into the present disclosure.

The embodiment of this invention that includes voice activation when the computer is body-worn also includes a body-worn display screen such as a head-worn or arm-worn display. The computer housing in the present invention includes all of the components found in a conventional computer such as a storage means, processor means, audio transducer and converter means, and recognizing means, all of which are described in detail in U.S. Pat. No. 5,305,244. Also included in this embodiment are means for mounting the computer housing onto a user; generally, attachment is made on a belt worn by a user such as around the waist, over the shoulder or on to a vest hereinafter torso worn. The sides of the computer housing are ribbed or louvered to permit heat to be dissipated from the interior of the housing and to allow proper internal temperature best suited for computer operation. The computer housing generally is made of a lightweight yet rigid plastic or other suitable material. It is contoured or curved to follow the curvature of the human body such as the waistline. The portion of the computer housing that contacts the user's body has a movable stand that doubles as a belt loop (when used as a body-worn computer) and a lift stand when used as a conventional computer. The electrical cord conduit connections found in the back portion of the housing are also contoured to parallel the curvature of the waist. Once placed on a flat supporting surface for use as a conventional computer, the conduits would point downwardly at an angle which would make it difficult to connect cables for monitor, power or keyboard connection. To correct for this, a movable lift stand is located on the rear underside of the computer housing. When this lift stand is moved down, it lifts the rear or back portion of the computer housing so that the conduits are on a plane substantially parallel with the supporting surface and are pointed straight out. This allows easy insertion of cables and electrical connectors into the conduits. The front underside of the housing will in the preferred embodiment also have a loop through which a belt will fit when attaching to a user. The conduits which are preferably located in the rear side of the housing are used for cable connection to the body or head-mounted display or conventional monitor. Another aperture is used for connection to a power supply and a third aperture may be used for connection to a keyboard when used as a stand alone, laptop or desktop computer.

When the structure of this invention is used as a conventional computer, there are located on the top section of the housing three movable levers, joy sticks or buttons or other means, one to operate a mouse and the other two for program execution or cursor manipulation. When the mobile funtion is desired, the top, movable button or lever will always be used in the same manner whether worn on the right or left-hand side of the user.

DESCRIPTION OF THE DRAWING AND PREFERRED EMBODIMENTS

Figure 1:
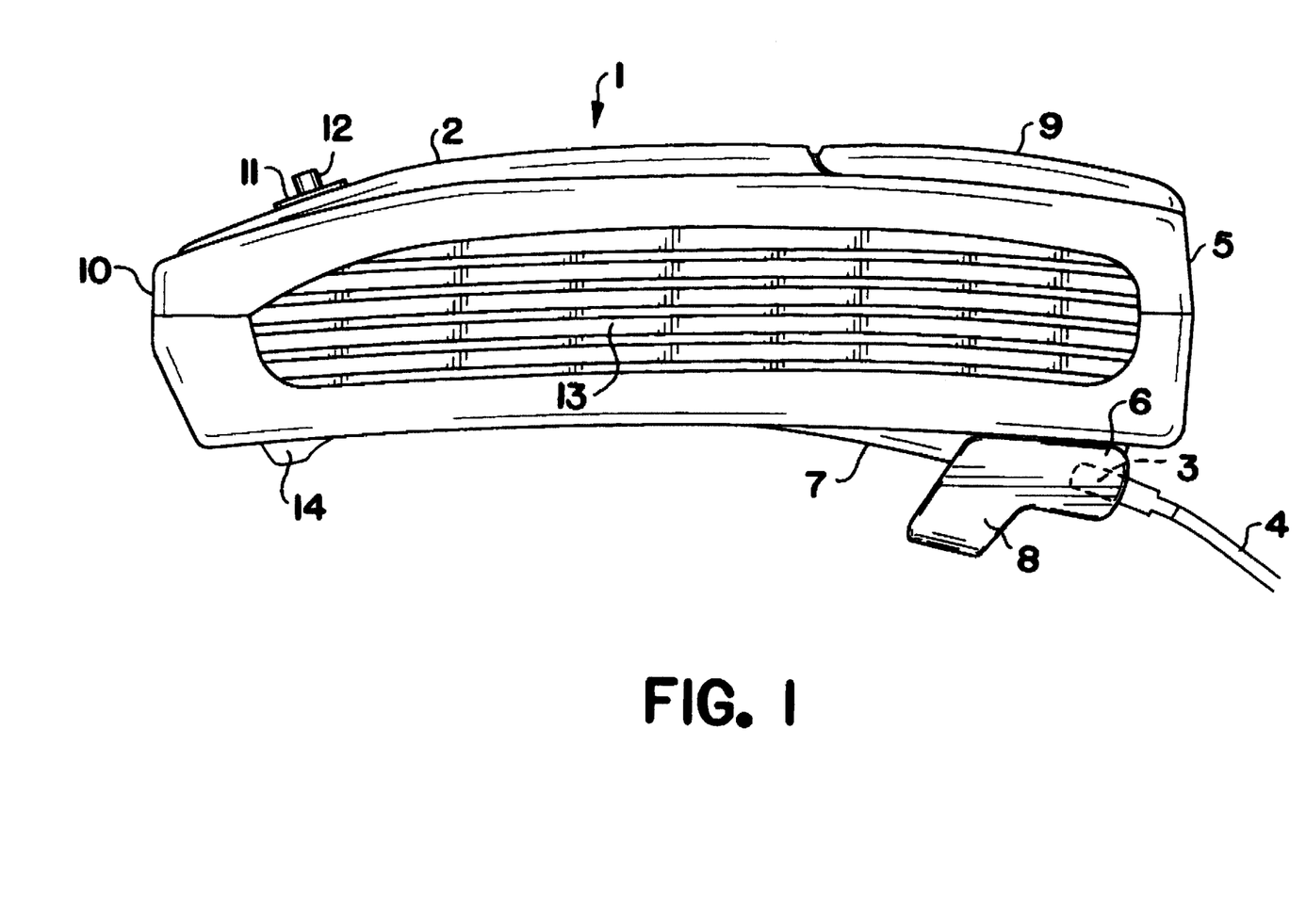
FIG. 1 is a side view of the convertible body-worn computer of the present invention.
Figure 2:
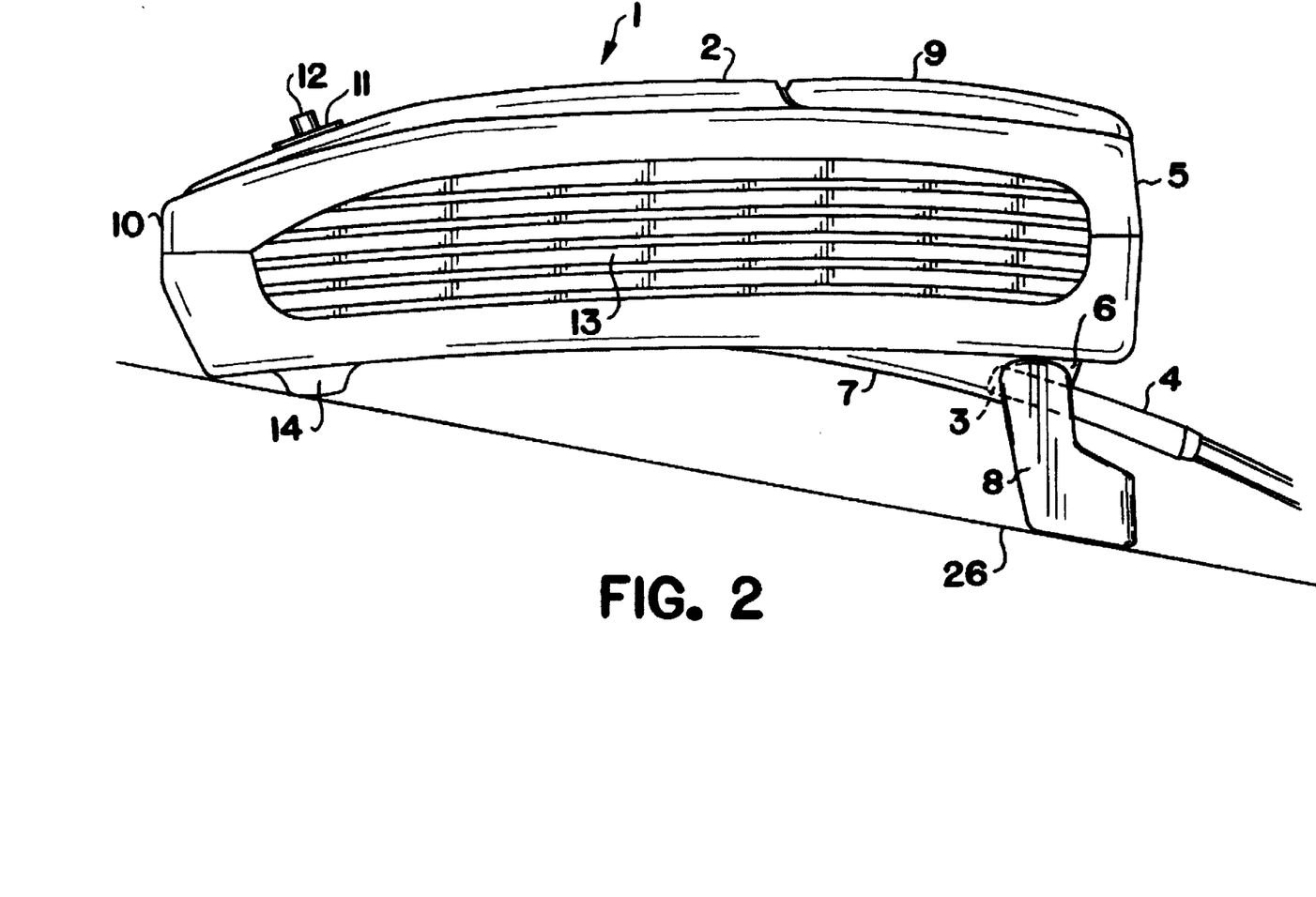
FIG. 2 is a side plan view of the present body-worn computer when converted into and used as a desktop or laptop computer with the lift stand in the down position.
Figure 6:
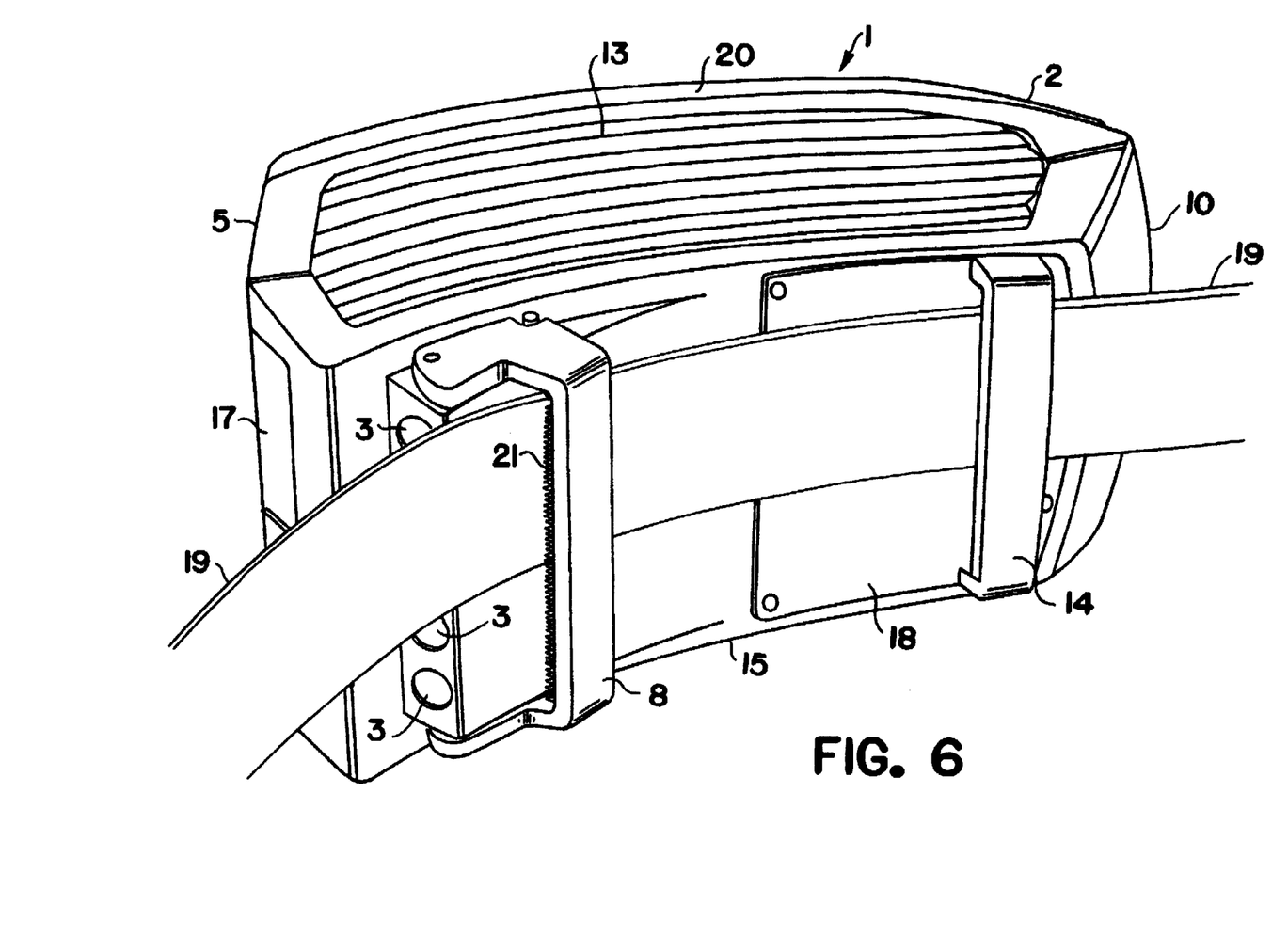
FIG. 6 is a right bottom perspective view of the convertible body-worn computer with the lift stand folded up and a belt fitted through the lift stand and the opposite belt loop.
Figure 7:
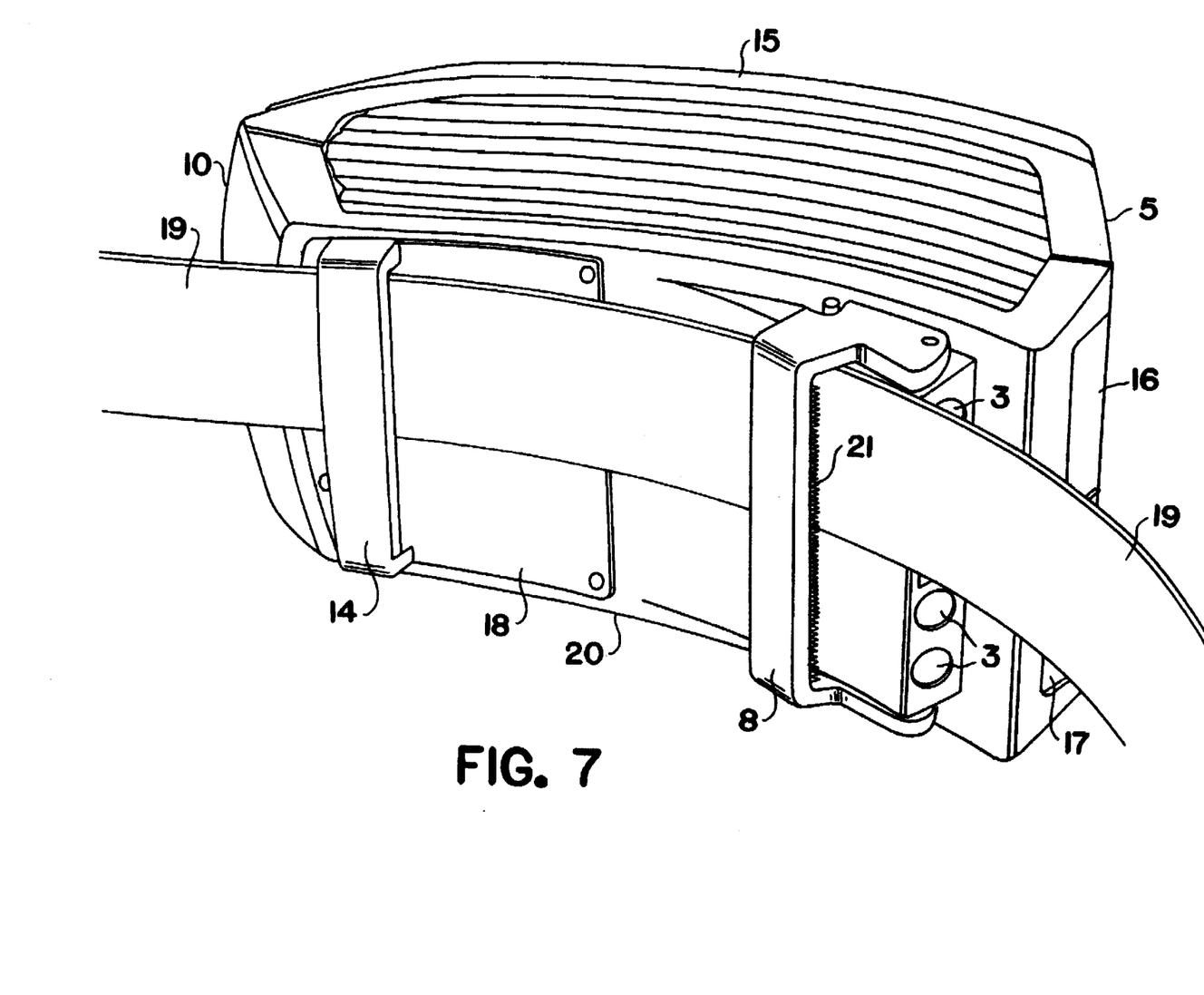
FIG. 7 is a left bottom perspective view of the convertible body-worn computer with the lift stand folded up and a belt fitted through the lift stand and the opposite belt loop.

In FIG. 1, the computer 1 of this invention is shown from the side. The computer housing 2 contains all of the components needed for a conventional computer but having outlets 3 for connection to any desired function such as a head set or additional power supply, monitor, keyboard or any other desired function or means. The peripheral outlets or conduits 3 shown in dotted lines are slanted upwardly at an angle so as to conform to the human body (or waistline) when the computer 1 is worn. The cables or other connectors 4 will fit into conduits 3 and be conveniently extended from the back portion 5 of the computer 1. The outlets 3 are located in the bottom extension 6 which is also curved at 7 to fit comfortably around the waist or shoulder or other portions of the human body. Also located in the lower back section 5 of the computer is a movable lift stand 8 which is folded up when worn and folded or moved down when converted into a laptop, desktop or other conventional computer. When the lift stand 8 is moved down, the apertures or outlets 3 are easily accessible (as shown in FIG. 2) as the computer is used as a conventional computer. The lift stand acts not only as a stand but also double acts as a belt loop as shown in FIGS. 6 and 7. The belt loop (one or both) have gripping teeth 21 in one embodiment. These teeth 21 are used to hold tight against a belt and prevent sliding of the computer housing 2 when worn. On the top rear portion 5 of the computer housing 2 in one embodiment is a door 9 which is used to house two PCMCIA card slots. On the top front portion 10 of the computer housing 2 are central buttons 11 and joy stick or lever 12. The lever 12 is used to move and control a mouse pointer when the computer 1 is used as a mobile or conventional computer. The control buttons 11 are used for program execution or menu selection when the computer 1 is used as a conventional computer. These controls 11 and 12 are clearly illustrated in FIGS. 3 and 4. On the sides of the computer 1 are located vent louvers (or a heat sink) 13 which allow the heat from inside the computer housing 2 to be dissipated or vented out to the atmosphere. These ribbed side vents or louvers 13 help reduce the inside heat which heat could cause malfunctioning or slowing down of the computer functions. The computer housing 2 is symetrical so that when it is worn on either the right-hand side or left-hand side of the user's waist, the back section 5, peripheral connector means 3 and cables 4 will always face the back of the user; see FIGS. 8 and 9. When the computer 1 is used or converted into a conventional computer and placed on a flat desk or other surface 26 as shown in FIG. 2, a stationary stand 14 is used to support the front section 10 of the computer. This front stand 14 is also used as a belt loop (or handle) as shown in FIGS. 6 and 7. In FIG. 2, lift stand 8 is moved down to permit easy connection of cables 4 to outlets 3. It can be seen that without lift stand 8, connection of cables would be very difficult because of the extreme angle of outlet conduits 3. When computer 1 is used or converted to a conventional computer, cables 4 connect to components of a conventional computer such as monitors, keyboards, power supplies or any other desirable component. The stand 8 when down permits easy access to conduits 3 and allows the computer 1 to be used on a flat surface 26 as is customary when using a conventional or laptop computer. The louvered sides or vents 13 allow heat dissipation in this mode of use.

Figure 3:
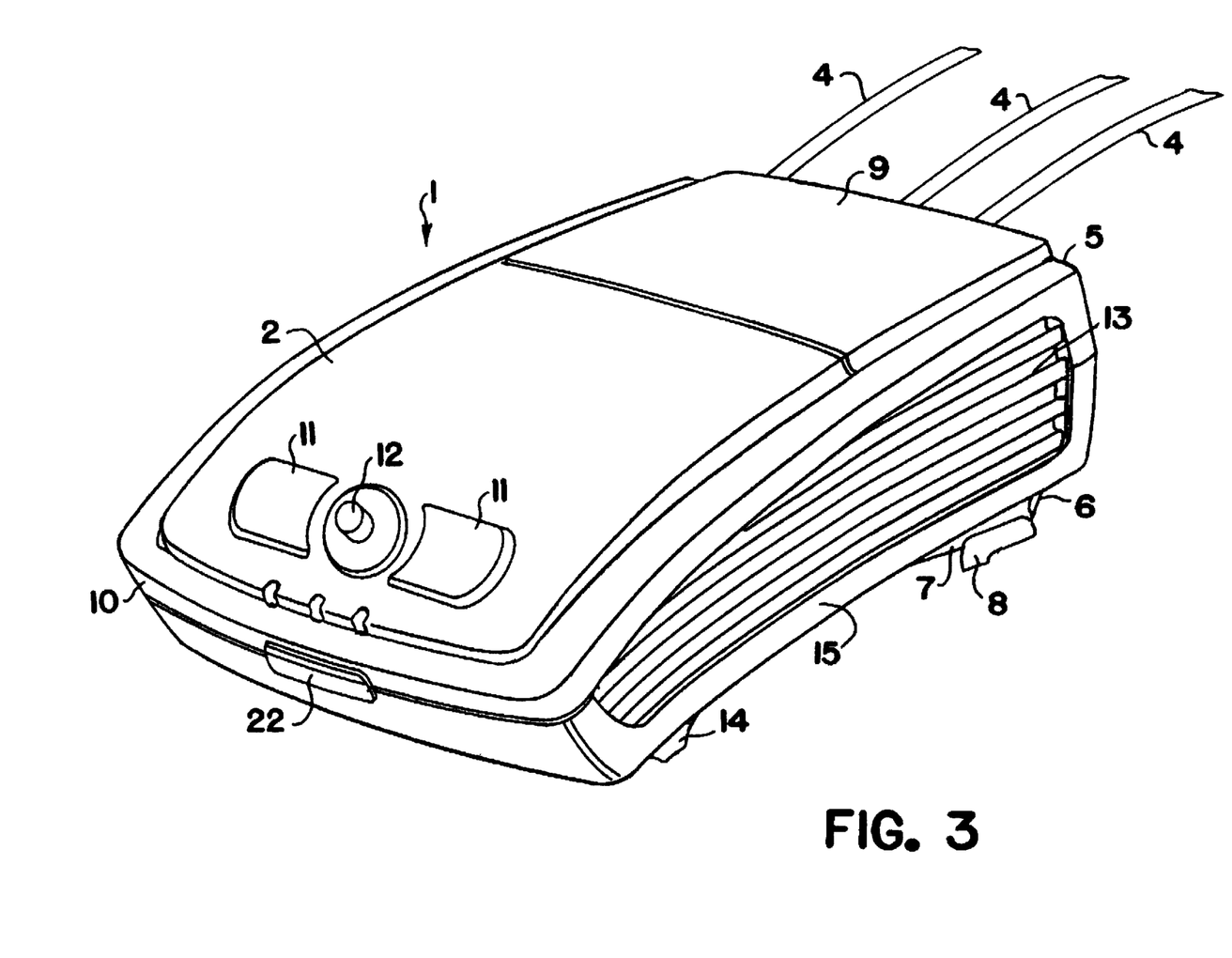
FIG. 3 is a left top perspective view of the convertible body-worn computer with the lift stand in the up position.

In FIG. 3, the top front 10 of the computer is illustrated wherein control buttons 11 are easily accessible to both right- and left-handed users. When the computer housing 2 is turned upside down in changing from right-hand to left-hand use (see FIG. 8 and 9), the controls of buttons 11 and mouse lever 12 always face the front of the user for easy access and use. Conversely, when right side 15 is facing up or down when worn, the controls 11 and 12 always face the front and cables 4 and outlets 3 always face the back of the user. Controls or software can be provided to convert or reverse the functions of controls or buttons 11. Versa Pointe® mouse pointing technology may be used as one suitable means in controls 11 and 12. Versa Point® is a trademark of Interlink Electronics of 547 Flynn Rd., Camarillo, Calif. 93012. Opening 22 is IrDA port that can be used for wireless communications.

Figure 4:
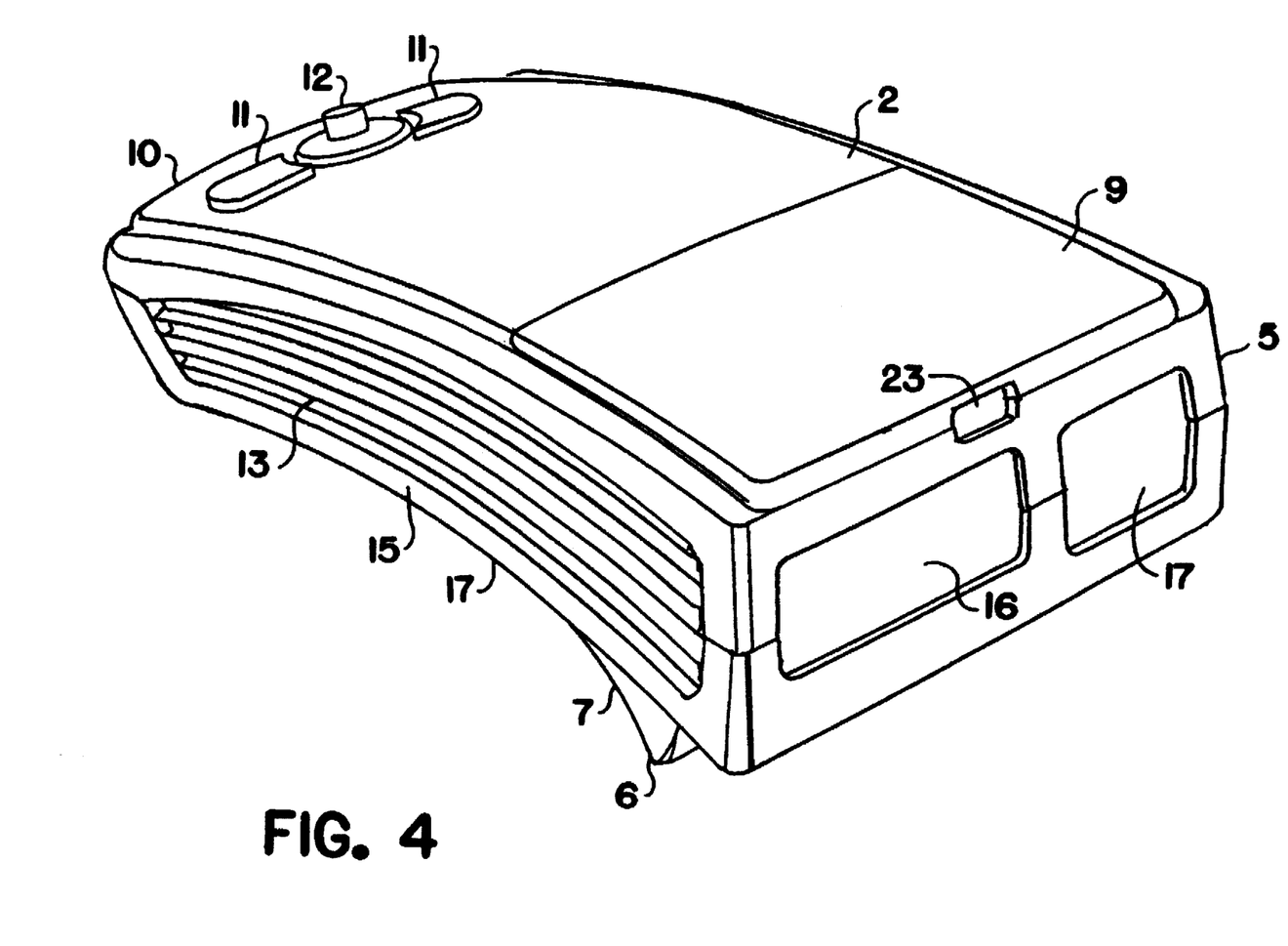
FIG. 4 is a right top perspective view of the convertible body-worn computer without the lift stand.
Figure 5:
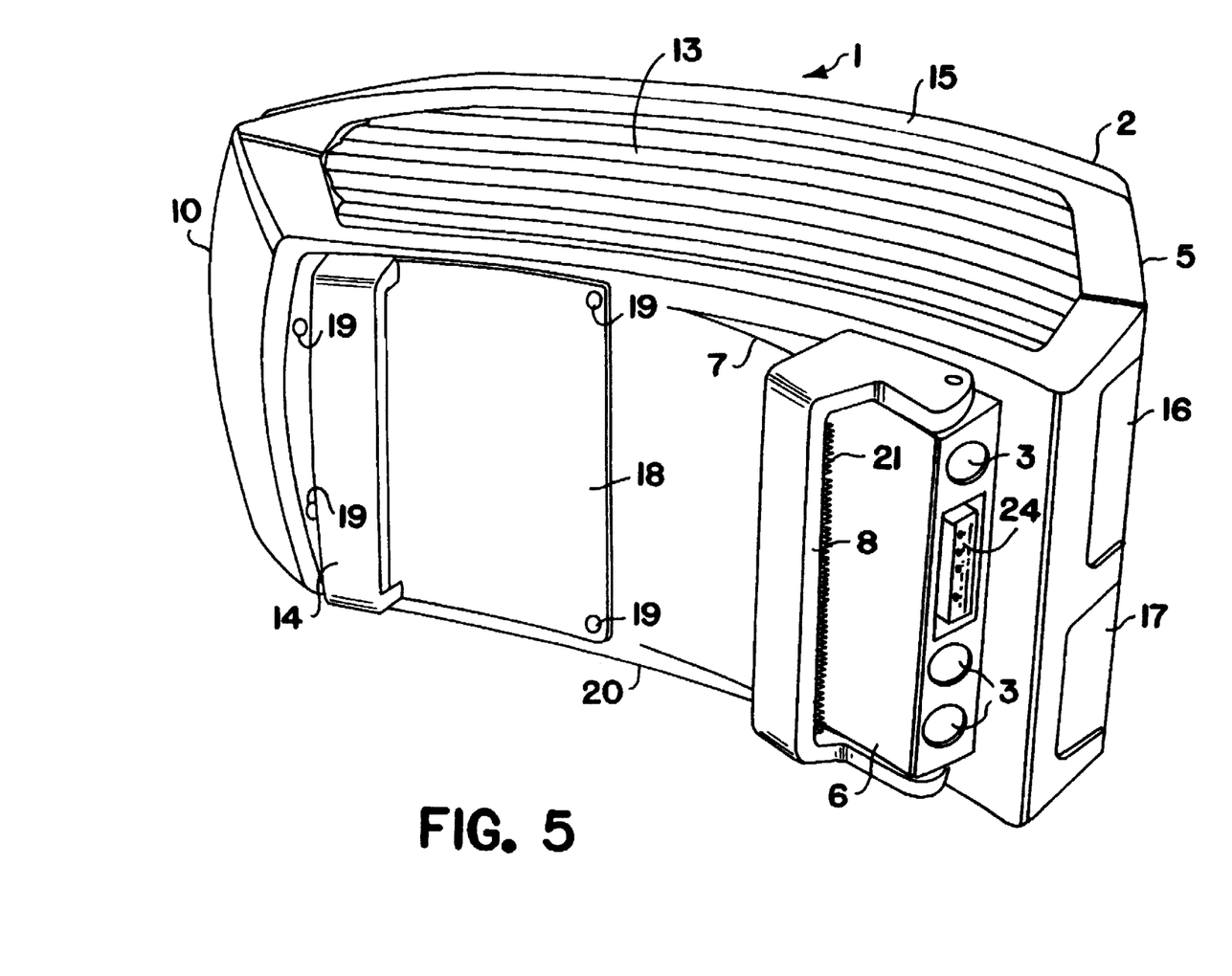
FIG. 5 is a bottom perspective view of the convertible body-worn computer with the lift stand folded up and a second belt loop on the opposite end.

In FIG. 4, a top back view of the computer 1 is shown without the lift stand 8 and front stand 14 for clarity. The positioning of bottom extension 6 is shown slightly indented and below back portion 5 of the computer housing 2. The curvature 27 of housing 2 which is adjacent to the user's body is shown in FIG. 4. While FIG. 4 and the other figures all show (for clarity purposes only) a rectangular configuration for housing 2, other shapes or configurations may be used if desirable; for example, an oval or circular configuration may be used if the other specifics of this invention as claimed are present. Openings 16 and 17 provide means for connecting to computer 1 other peripheral equipment such as floppy drives, bar code scanners, VGA port or external monitor connectors. Housing 2 preferably is constructed of a lightweight, structurally strong plastic. Outlets 3, any suitable number of them, may be used and are positioned in bottom extension 6 but are not visible in FIG. 4. FIGS. 5–7 clearly show the location of these electrical outlets or conduits 3. Opening 23 is a cable opening for cables used with PCMCIA card slots.

In FIG. 5, the bottom of housing 2 is shown in a preferred embodiment having front stand-front loop 14 located in a position in front 10. An easy access door 18 is located in the bottom section and provides an access cover for insertion into the bottom of housing 2 of storage means or non-volatile storage means. Four screws 19 are easily removed to permit access therein. Movable lift stand 8 is shown folded up (body-worn mode) but is conveniently moved downward as shown in FIG. 2 (conventional computer mode) when desired. As shown in FIG. 5, lift stand 8 and front stand 14 act as loops or belt guides when computer 1 is worn around the waist or elsewhere on the user's body. Stands 8 and 14 are shown protruding in an exaggerated manner to show the structure and function; however, any comfortable arrangement may be used for the comfort and convenience of the user. Outlet 24 is used to connect a head-mounted display (HMD) to the computer 1 when it is used as a body-worn computer.

FIG. 6 shows a belt 19 fitted through loops 8 and 14 which also act as the computer housing stands earlier discussed. Notice that a left-handed user would mount the computer 1 in this fashion so that front computer section 10 faces his or her front and conduits or outlets 3 face his or her back. In lieu of or together with teeth 21, the loops 8 and 14 could be made smaller to fit tighter with a belt if desired. In all of the FIGS. 1–9, the computer 1 is used with hands-free activation means as disclosed in U.S. Pat. No. 5,305,244 and co-pending application Ser. No. 08/538,194. FIG. 7 shows the computer housing 2 when worn by a right-hand user; notice that right side 15 is up in this configuration, and side 15 is facing down in the left-hand belt mounting of FIG. 6. This is accomplished since, as earlier mentioned, the computer housing is symmetrical. "Symmetrical" as used herein means symmetry of longitudinal sides 15 and 20, ie. are alike in size, shape and position. Left side 20 in FIG. 7 is facing downward.

Figure 8:
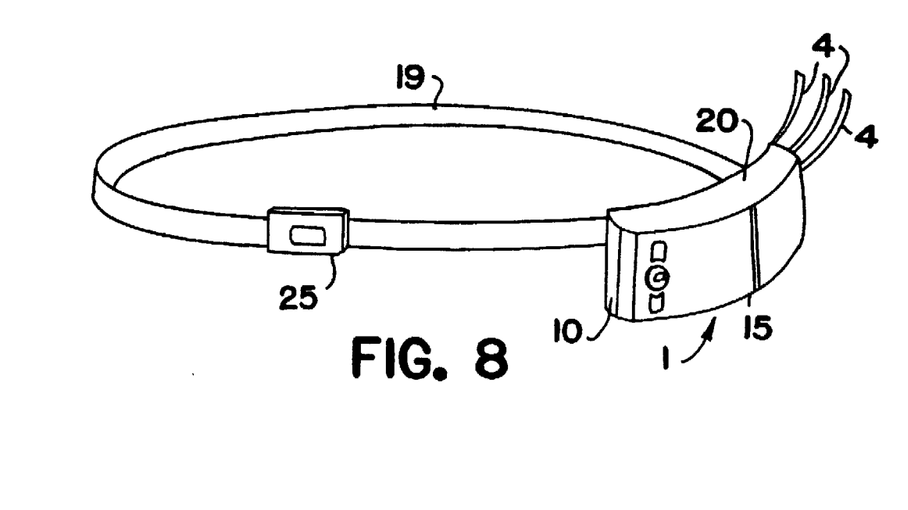
FIG. 8 is a perspective view of the body worn computer as worn on the waist on the left-hand side of the user.
Figure 9:
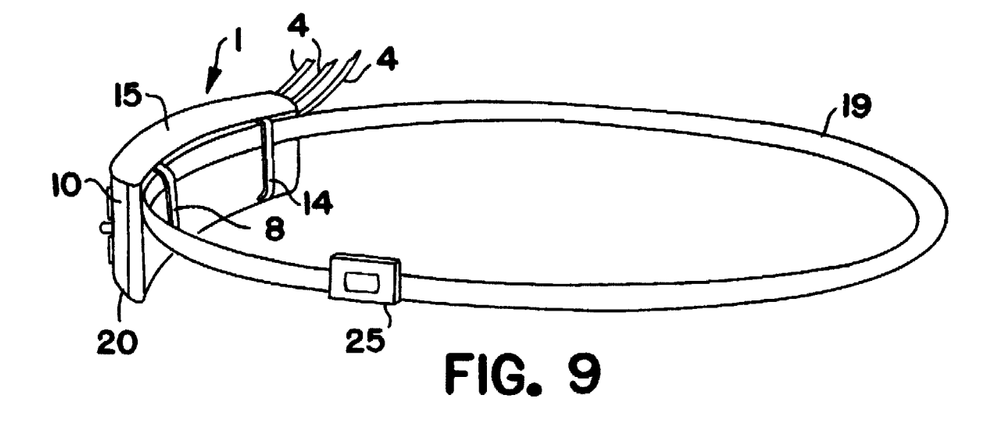
FIG. 9 is a perspective view of the body-worn computer as worn on the waist on the right-hand side of a user.

In FIGS. 8 and 9, the computer 1 is shown when used as a mobile body-worn computer around the waist of a user. A belt 19 encircles the waistline of the user with computer 1 occupying only a portion of the waistline, unlike the computer of Janik I and II which encircles and occupies substantially the entire waistline. Also all of the computer components necessary for a conventional computer are compactly located in one housing in the present invention. Notice that as earlier stated, the cables 4 always face the back or rear of the user so that they are out of the way when the user is using his or her hands for the task at hand, ie. repairing a machine, etc. When this disclosure uses the term "waist" or "waistline", it is understood to include other parts of the human body in which it would be desirable to wear this computer. In FIGS. 8 and 9, the belt buckle 25 is shown as worn around the waist and facing the front of the user.

Figure 10:
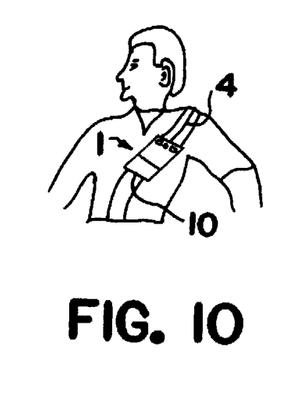
FIG. 10 is a perspective view of the body-worn computer of this invention as worn over the shoulder of a user.

In FIG. 10, for example, the body worn computer 1 is shown as it is worn over the shoulder of a user. In this situation, front side 10 still points to the front (but downwardly) and the back or rear side 5 of the computer faces the back (but upwardly) of the user. In this embodiment, if desirable, the computer housing 2 can be used whereby front portion 10 can face the front or back of the user.

The preferred and optimally preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A mobile torso-worn computer comprising a computer housing, computer activation means, means for connection to a head mounted display, means for attaching said computer housing to the torso of a user, said computer housing having a front portion and a back portion, means for wearing said computer housing on the right or left side of the torso of a user whereby said front portion and said back portion are always pointed in the same direction, means attached to a bottom portion of said housing for adapting said mobile torso-worn computer to a conventional stand alone computer, said computer housing containing substantially all of the components of a conventional computer except for a monitor, said computer housing having peripheral connector means on its back portion, said peripheral connector means having means for connection to cables that will always extend from said back portion to said head mounted or other display means, and wherein said computer housing has torso attaching means that will fit adjacent said user, said attaching means also comprising means to convert said mobile torso-worn computer to a stand alone computer.

2. The computer of claim 1 wherein said stand alone computer comprises connection means to be used with a power supply, a keyboard or a monitor.

3. The computer of claim 1 wherein said means for attaching said computer housing to a user is in the form of a plurality of belt loops having belt teeth retaining means therein, at least one of said belt loops having a structure wherein it can act as a lift stand when folded down to convert said mobile torso-worn computer into a stand alone computer.

4. The computer of claim 1 having a movable lift stand movably attached to a bottom portion of said housing to convert said mobile torso-worn computer to a conventional stand alone computer.

5. The computer of claim 1 wherein said housing has mouse control means on its front portion.

6. The computer of claim 1 wherein said computer housing has longitudinal side portions that are symmetrical.

7. The computer of claim 1 wherein said computer housing has heat venting means on at least one side portion thereof.

8. A mobile waist worn computer comprising a computer housing, activation means, means for connection to a head mounted display, and means for attaching said computer housing on the waist of a user, said computer housing having a front and a back portion, said back portion containing peripheral outlets having means for receiving cables for connection to said head mounted display and other desired external functions, means for wearing said computer housing on a portion of the right or left side of a user's waist, whereby said front and said back portions are always positioned in the same direction and wherein said cables always extend from the back portion of said computer housing when worn on both said fight or said left side waist of a user, attached to said housing is a lift stand which also acts as a belt loop which is located on the lower portion of said housing that when in a down position converts said mobile waist worn computer into a stand alone computer, and wherein said activation means is selected from the group consisting of an audio activation means, mouse activation means and mixtures thereof.

* * * * *